United States Patent
Itakura

(10) Patent No.: US 11,621,130 B2
(45) Date of Patent: Apr. 4, 2023

(54) ENERGY STORAGE APPARATUS AND METHOD OF USING THE SAME

(71) Applicants: Robert Bosch GmbH, Stuttgart (DE); GS Yuasa International Ltd., Kyoto (JP)

(72) Inventor: Daichi Itakura, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 321 days.

(21) Appl. No.: 16/640,676

(22) PCT Filed: Nov. 16, 2018

(86) PCT No.: PCT/EP2018/081499
§ 371 (c)(1),
(2) Date: Feb. 20, 2020

(87) PCT Pub. No.: WO2019/101632
PCT Pub. Date: May 31, 2019

(65) Prior Publication Data
US 2020/0358143 A1    Nov. 12, 2020

(30) Foreign Application Priority Data
Nov. 22, 2017   (JP) .............................. JP2017-224617

(51) Int. Cl.
*H02J 7/00* (2006.01)
*H01G 11/14* (2013.01)
(Continued)

(52) U.S. Cl.
CPC ............. *H01G 11/14* (2013.01); *H01G 11/32* (2013.01); *H01M 4/364* (2013.01); *H01M 4/386* (2013.01);
(Continued)

(58) Field of Classification Search
USPC ......................................................... 320/136
See application file for complete search history.

(56) References Cited

U.S. PATENT DOCUMENTS

| | | |
|---|---|---|
| 2011/0033735 A1 | 2/2011 | Kinoshita et al. |
| 2014/0127557 A1 | 5/2014 | Kasahara et al. |

(Continued)

FOREIGN PATENT DOCUMENTS

| | | |
|---|---|---|
| JP | 2010-045001 A | 2/2010 |
| JP | 2014-120335 A | 6/2014 |

(Continued)

OTHER PUBLICATIONS

Iternational Search Report (ISR) (PCT Form PCT/ISA/210), in PCT/EP2018/081499, dated Feb. 14, 2019.

*Primary Examiner* — Bryce M Aisaka
(74) *Attorney, Agent, or Firm* — McGinn I.P. Law Group, PLLC.

(57) ABSTRACT

Provided is an energy storage apparatus capable of appropriately controlling use of a silicon material in normal times and achieving long life, and a method of using the energy storage apparatus. One aspect of the present invention is an energy storage apparatus that includes an energy storage device and a measuring section for measuring an internal pressure change rate of the energy storage device, the energy storage device having a negative electrode that contains a carbon material and a silicon material. Another aspect of the present invention is a method of using the energy storage apparatus that includes performing discharge while the internal pressure change rate of the energy storage device is measured.

11 Claims, 3 Drawing Sheets

(51) Int. Cl.

| | | |
|---|---|---|
| *H01G 11/32* | (2013.01) | |
| *H01M 4/36* | (2006.01) | |
| *H01M 4/38* | (2006.01) | |
| *H01M 4/583* | (2010.01) | |
| *H01M 10/42* | (2006.01) | |
| *H01M 10/44* | (2006.01) | |
| *H01M 10/48* | (2006.01) | |

(52) U.S. Cl.
CPC ......... *H01M 4/583* (2013.01); *H01M 10/425* (2013.01); *H01M 10/445* (2013.01); *H01M 10/48* (2013.01); *H02J 7/0029* (2013.01); *H02J 7/00719* (2020.01); *H01M 2010/4278* (2013.01)

(56) References Cited

U.S. PATENT DOCUMENTS

| | | | |
|---|---|---|---|
| 2014/0170484 A1 | 6/2014 | Fukahori | |
| 2016/0064972 A1* | 3/2016 | Stefanopoulou | H02J 7/0021 |
| | | | 324/426 |
| 2016/0285064 A1* | 9/2016 | Hatta | H01M 10/44 |
| 2017/0288216 A1* | 10/2017 | Kamo | H01M 4/0471 |
| 2021/0197691 A1* | 7/2021 | Stefanopoulou | H01M 10/48 |

FOREIGN PATENT DOCUMENTS

| | | |
|---|---|---|
| JP | 2014-120459 A | 6/2014 |
| JP | 2015-053152 A | 3/2015 |
| JP | 2015-088462 A | 5/2015 |
| WO | WO 2012/169282 A1 | 12/2012 |
| WO | WO 2014/128909 A1 | 8/2014 |
| WO | WO 2016/120917 A1 | 8/2016 |

* cited by examiner (a)

(b)

(c)

ENERGY STORAGE APPARATUS AND METHOD OF USING THE SAME

TECHNICAL FIELD

The present invention relates to an energy storage apparatus and a method of using the energy storage apparatus.

BACKGROUND ART

A nonaqueous electrolyte secondary battery represented by a lithium ion secondary battery is often used, for its high energy density, in, for example, personal computers, electronic devices such as a communication terminal, and vehicles. The nonaqueous electrolyte secondary battery generally includes an electrode assembly having a pair of electrodes that are electrically separated from each other with a separator, and includes a nonaqueous electrolyte interposed between the electrodes, and the nonaqueous electrolyte secondary battery is configured to allow ions to be transferred between both the electrodes for charge-discharge. Capacitors such as a lithium ion capacitor and an electric double layer capacitor are also widely used as energy storage devices other than the secondary battery.

As one of such energy storage devices, an energy storage device has been developed that includes a silicon material such as silicon oxide as an active material for a negative electrode (see Patent Documents 1 to 4). The silicon material has an advantage of having a larger geometric capacity than the geometric capacity of a carbon material widely used as a negative active material.

PRIOR ART DOCUMENTS

Patent Documents

Patent Document 1: JP-A-2015-053152
Patent Document 2: JP-A-2014-120459
Patent Document 3: JP-A-2015-088462
Patent Document 4: WO 2012/169282

SUMMARY OF THE INVENTION

Problems to be Solved by the Invention

The silicon material, however, is known to easily cause breakage and isolation of particles due to expansion and contraction associated with repetitive charge-discharge and to be deficient in cycle life performance. Thus, main use of a carbon material is considered, with use of the silicon material limited, in an energy storage device including the carbon material and the silicon material as negative active materials. Such limited use of the silicon material is partly considered to be conducted on the basis of the voltage with use of the difference in discharge start potential between the silicon material and the carbon material. It, however, becomes difficult to appropriately control the use of the silicon material on the basis of the voltage because the voltage during discharge varies due to a change, which is caused by repetitive charge-discharge, in the degree of deterioration of positive and negative electrodes and in balance of the state of charge between positive and negative electrodes.

The present invention has been made under the circumstances described above, and an object of the present invention is to provide an energy storage apparatus capable of appropriately controlling use of a silicon material in normal times and achieving long life, and a method of using this energy storage apparatus.

Means for Solving the Problems

One aspect of the present invention that has been made to solve the problems is an energy storage apparatus that includes an energy storage device and a measuring section for measuring an internal pressure change rate of the energy storage device, the energy storage device having a negative electrode that contains a carbon material and a silicon material.

Another aspect of the present invention is a method of using the energy storage apparatus that includes performing discharge while the internal pressure change rate of the energy storage device is measured.

Advantages of the Invention

According to the present invention, it is possible to provide an energy storage apparatus capable of appropriately controlling use of a silicon material in normal times and achieving long life, and a method of using this energy storage apparatus.

MODE FOR CARRYING OUT THE INVENTION

One aspect of the present invention is an energy storage apparatus that includes an energy storage device and a measuring section for measuring an internal pressure change rate of the energy storage device, the energy storage device having a negative electrode that contains a carbon material and a silicon material.

Between a carbon material and a silicon material, the carbon material has a higher discharge potential. Therefore, a negative electrode that is sufficiently charged and contains a carbon material and a silicon material allows, during discharge, a discharge reaction of the carbon material to first mainly occur and a discharge reaction of the silicon material to start to occur after the discharge reaction of the carbon material is substantially completed. Here, the internal pressure (inner pressure) of the energy storage device varies along with a change in volume of an active material during the charge-discharge. Further, a change in volume of a negative active material is generally larger than a change in volume of a positive active material, to largely affect the change of the internal pressure. Therefore, specifically, the negative active material expands for occlusion of, for example, lithium ions during charge. Accordingly, the negative electrode has the highest internal pressure when full charged, and the internal pressure lowers along with discharge. Further, the silicon material has a larger change in volume associated with charge-discharge than a change in volume of the carbon material. Therefore, in the energy storage device including both the carbon material and the silicon material as negative active materials, the internal pressure change rate is low at the stage where the discharge reaction occurs mainly in the carbon material, and the internal pressure change rate increases at the stage where the charge rate lowers to cause the discharge reaction to mainly occur in the silicon material. The term "internal pressure change rate" refers to a rate of the amount of change in internal pressure with respect to the amount of change in amount of charge (residual amount of electricity in an energy storage device). That is, in a graph with the amount of charge set as a horizontal axis and the internal pressure as a vertical axis, the inclination of the graph represents the internal pressure change rate.

Figure 3:
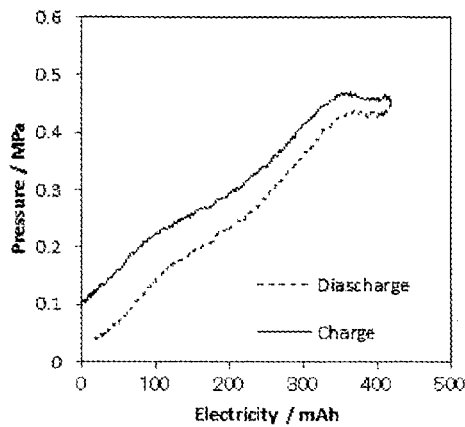
FIG. 3(a) is a graph showing the relationships between the internal pressure and the amounts of charge and discharge during charge and discharge in an energy storage device including graphite as a negative active material.
FIG. 3(b) is a graph showing the relationships between the internal pressure and the amounts of charge and discharge during charge and discharge in an energy storage device including, as a negative active material, a mixture of graphite with silicon oxide (mass ratio 95:5).
FIG. 3(c) is a graph showing the relationships between the internal pressure and the amounts of charge and discharge during charge and discharge in an energy storage device including, as a negative active material, a mixture of graphite with silicon oxide (mass ratio 90:10).
Figure 3:
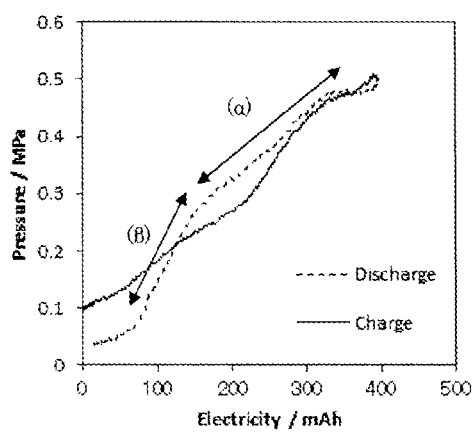
Figure 3:
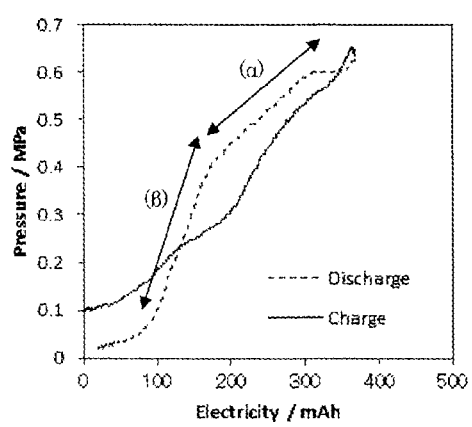

The internal pressure change rate is described in detail by way of the measurement results of FIGS. 3(a) to 3(c). FIG. 3(a) shows a curve (dotted line) for change in internal pressure that gives almost constant inclination, the curve representing a change in internal pressure during discharge of an energy storage device including graphite as a negative active material. That is, in FIG. 3(a), the change in internal pressure change rate is low. In contrast, FIG. 3(b) shows a curve (dotted line) for change in internal pressure that gives small inclination in a discharge initial stage (α) and larger inclination from the following stage (β), the curve representing a change in internal pressure during discharge of an energy storage device including, as a negative active material, a mixture of graphite with silicon oxide (mass ratio 95:5). That is, it is considered that the stage (α) allows the discharge reaction to occur mainly in graphite as the carbon material and the stage (β) allows the discharge reaction to occur mainly in silicon oxide as the silicon material. FIG. 3(c) for an energy storage device including, as a negative active material, a mixture of graphite with silicon oxide (mass ratio 90:10) shows the same tendency as in FIG. 3(b). Thus, the energy storage device that includes a negative electrode containing a carbon material and a silicon material is understood to increase the internal pressure change rate at the timing of a shift of the main reaction from a discharge reaction by the carbon material to a discharge reaction by the silicon material. The inventors have confirmed that the change in internal pressure change rate shows the same tendency even with repetitive charge-discharge.

Accordingly, with use of the energy storage apparatus including a measuring section for measuring the internal pressure change rate, it is possible to, for example, complete the discharge and charge the apparatus when the internal pressure change rate rises, enabling the discharge to be performed mainly using only the reaction of the carbon material. As described above, since the tendency of a change in internal pressure change rate is invariable even with repetitive charge-discharge, the energy storage apparatus is capable of always appropriately deciding the timing of completion of the stage where the discharge reaction of the carbon material is mainly performed. Therefore, the energy storage apparatus is capable of appropriately controlling use of the silicon material in normal times and achieving long life. Further, the energy storage apparatus uses the discharge reaction of the carbon material in normal times and uses the discharge reaction of the silicon material having a high capacity, for example, in an emergency, to enable effective utilization of the silicon material in an emergency as well as prevention of deterioration of the silicon material.

The energy storage apparatus preferably further includes a transmitting section for transmitting a signal when the internal pressure change rate measured by the measuring section reaches or exceeds a prescribed threshold or starts to rise. The energy storage apparatus that includes such a transmitting section allows, in normal times, a user to complete the discharge and charge the apparatus when the signal is transmitted and thus to use the charge-discharge of the carbon material that is relatively uneasily deteriorated, enabling the apparatus to achieve long life.

The proportion of the silicon material is preferably 10% by mass or less in the total of the carbon material and the silicon material. In this case, it is possible to secure a sufficient discharge capacity in normal use and accurately detect the completion time of the discharge.

The energy storage apparatus preferably further includes a first display part for displaying a lowered charge rate of the energy storage device on the basis of the signal from the transmitting section when the internal pressure change rate measured by the measuring section reaches or exceeds a prescribed threshold or starts to rise. The energy storage apparatus that includes such a first display part allows, in normal times, a user to complete the discharge and charge the apparatus when the information is displayed and thus to use the charge-discharge of the carbon material that is relatively uneasily deteriorated, enabling the apparatus to achieve long life.

The energy storage apparatus preferably further includes a second display part for displaying, during discharge of the energy storage device, information on whether the discharge is mainly by a discharge reaction of the carbon material or by a discharge reaction of the silicon material, on the basis of the internal pressure change rate measured by the measuring section or the signal from the transmitting section. The energy storage apparatus that includes such a second display part allows, for example, in normal times, a user to repetitively use the charge-discharge of the carbon material that is relatively uneasily deteriorated, enabling the apparatus to achieve long life.

The energy storage apparatus preferably further includes a third display part for displaying, on the basis of the signal from the transmitting section, at least one of the internal pressure change rate measured by the measuring section and the charge rate of the energy storage device derived from the internal pressure change rate. The energy storage apparatus that includes such a third display part allows a user to confirm the internal pressure change rate or the charge rate and thus, for example, in normal times, to use the energy storage apparatus within a range of the internal pressure change rate or the charge rate that relatively uneasily deteriorates the apparatus, enabling the apparatus to achieve long life.

Another aspect of the present invention is a method of using the energy storage apparatus that includes performing discharge while the internal pressure change rate of the energy storage device is measured. According to the use method, discharge is performed while the internal pressure change rate is measured, to enable a user to stop the discharge and charge the apparatus, for example, when the internal pressure change rate rises, that is, when the stage allowing the main discharge reaction by the carbon material is completed. Further, the tendency of a change in internal pressure change rate is less likely to change even with repetitive charge-discharge, so that it is possible to appropriately decide when the stage allowing the main discharge reaction by the carbon material is completed, even after use of the energy storage apparatus with repetitive charge-discharge. Accordingly, the use method allows to appropriately control use of the silicon material deficient in cycle life performance and achieve long life of the energy storage apparatus.

<Energy Storage Apparatus>

Figure 1:
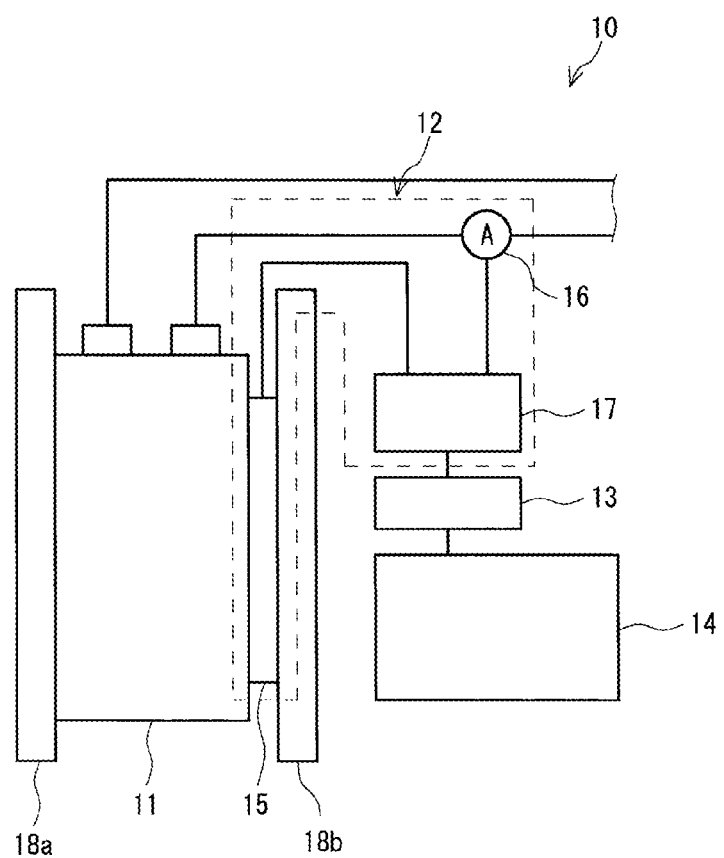
FIG. 1 is a schematic view showing an energy storage apparatus according to one embodiment of the present invention.

An energy storage apparatus 10 in FIG. 1 includes an energy storage device 11, a measuring section 12, a transmitting section 13, and a display part 14.

(Energy Storage Device 11)

The energy storage device 11 is a nonaqueous electrolyte energy storage device including a positive electrode, a negative electrode, and a nonaqueous electrolyte. Hereinafter, a nonaqueous electrolyte secondary battery is described as one example of the energy storage device 11. The positive electrode and the negative electrode form an alternately-stacked electrode assembly by layering or winding the positive electrode and the negative electrode normally with a separator interposed therebetween. This electrode assembly is housed in a case that is filled with the nonaqueous electrolyte. The nonaqueous electrolyte is interposed between the positive electrode and the negative electrode. As the case, it is possible to use, for example, known metal cases and resin cases that are normally used as a case of a secondary battery.

(Positive Electrode)

The positive electrode includes a positive substrate and a positive active material layer disposed on the positive substrate directly or with an intermediate layer interposed between the positive active material layer and the positive substrate.

The positive substrate has conductivity. Used as a material for the substrate are metals such as aluminum, titanium, tantalum, and stainless steel or alloys thereof. Among these materials, aluminum and an aluminum alloy are preferable for the balance among the potential resistance, conductivity level, and cost. Exemplified as a form of the positive substrate are a foil and a deposited film, and a foil is preferable in terms of costs. That is, an aluminum foil is preferable as the positive substrate. Examples of aluminum and the aluminum alloy include A1085P and A3003P specified in JIS-H-4000 (2014).

The intermediate layer is a covering layer that covers a surface of the positive substrate, and includes conductive particles such as carbon particles to reduce contact resistance between the positive substrate and the positive active material layer. The constitution of the intermediate layer is not particularly limited and the intermediate layer can be formed of a composition containing, for example, a resin binder and conductive particles. Having "conductivity" means having a volume resistivity of $10^7$ Ω·cm or less that is measured in accordance with JIS-H-0505 (1975) and the term "non-conductivity" means having a volume resistivity of more than $10^7$ Ω·cm.

The positive active material layer is formed of a so-called positive composite containing a positive active material. The positive composite that forms the positive active material layer contains an optional component such as a conducting agent, a binder (binding agent), a thickener, or a filler as necessary.

Examples of the positive active material include composite oxides represented by $Li_xMO_y$ (M represents at least one transition metal) (such as $Li_xCoO_2$, $Li_xNiO_2$, $Li_xMnO_3$, $Li_xNi_\alpha Co_{(1-\alpha)}O_2$, and $Li_xNi_\alpha Mn_\beta Co_{(1-\alpha-\beta)}O_2$ that have an α-NaFeO$_2$ layered crystal structure, and $Li_xMn_2O_4$ and $Li_xNi_\alpha Mn_{(2-\alpha)}O_4$ that have a spinel crystal structure) and polyanion compounds represented by $Li_wMe_x(XO_y)_z$ (Me represents at least one transition metal and X represents, for example, P, Si, B, or V) (such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$). The elements or the polyanions in these compounds may be partially substituted with another element or anion species. For the positive active material layer, these compounds may be used alone or by mixing two or more of these compounds.

The conducting agent is not particularly limited as long as it is a conductive material that does not adversely affect the performance of the energy storage device. Examples of such a conducting agent include natural or artificial graphite, carbon blacks such as furnace black, acetylene black, and ketjen black, metal, and conductive ceramic. The form of the conducting agent is, for example, powder or fiber.

Examples of the binder (binding agent) include thermoplastic resins such as fluororesin (e.g., polytetrafluoroethylene (PTFE) and polyvinylidene fluoride (PVDF)), polyethylene, polypropylene, polyacrylic acid, and a polyimide; elastomers such as ethylene-propylene-diene rubber (EPDM), sulfonated EPDM, styrene butadiene rubber (SBR), and fluororubber; inorganic salts such as an alkali metal silicate and phosphate; and a polysaccharide polymer.

Examples of the thickener include polysaccharide polymers such as carboxymethyl cellulose (CMC) and methyl cellulose. When the thickener has a functional group reactive with lithium, the functional group is preferably inactivated by, for example, methylation in advance.

The filler is not particularly limited as long as it does not adversely affect the battery performance. Examples of a main component of the filler include polyolefins such as polypropylene and polyethylene, silica, alumina, zeolite, glass, and carbon.

(Negative Electrode)

The negative electrode includes a negative substrate and a negative active material layer disposed on the negative substrate directly or with an intermediate layer interposed between the negative active material layer and the negative substrate. The constitution of the intermediate layer can be the same as the constitution of the intermediate layer in the positive electrode.

The constitution of the negative substrate can be the same as the constitution of the positive substrate. Used as a material for the negative substrate, however, are metals such as copper, nickel, stainless steel, and nickel-plated steel or alloys thereof, and copper or a copper alloy is preferable. That is, a copper foil is preferable as the negative substrate. Examples of the copper foil include a rolled copper foil and an electrolytic copper foil.

The negative active material layer is formed of a so-called negative composite containing a negative active material. The negative composite that forms the negative active material layer contains an optional component such as a conducting agent, a binder (binding agent), a thickener, or a filler as necessary. As regards the optional component such as a conducting agent, a binding agent, a thickener, or a filler, it is possible to use the same component as in the positive active material layer.

The negative active material contains a carbon material and a silicon material. That is, the negative active material is a mixture of the carbon material with the silicon material. Normally, a particulate carbon material and a particulate silicon material are mixed for use.

Examples of the carbon material include graphite and non-graphite carbon. Examples of non-graphite carbon include non-graphitizable carbon and graphitizable carbon. Graphite is preferable as the carbon material. The "graphite" refers to a carbon material having an average distance (d002) between lattice planes (002) of less than 0.340 nm, the lattice planes being identified by wide-angle X-ray diffraction. The "non-graphite carbon" refers to a carbon material having an average distance (d002) between lattice planes (002) of 0.340 nm or more, the lattice planes being identified by wide-angle X-ray diffraction.

The silicon material is an elemental substance or a compound containing silicon as a constituent element, such as elemental silicon, silicon oxide, or a silicon alloy. The silicon oxide is normally an oxide of silicon represented by $SiO_x$ ($0<x<2$). As the silicon oxide, it is also possible to use, for example, particles containing active atomic silicon, particles containing silicon oxide and a carbon material covering silicon oxide, and silicon oxide doped with lithium in advance. Examples of the silicon alloy include alloys of silicon with a transition metal, such as Ni—Si and Co—Si, and a Si—C alloy. Silicon oxide is preferable as the silicon material.

A lower limit of the content of the silicon material relative to the total content of the carbon material and the silicon material is, for example, preferably 1% by mass, more preferably 3% by mass, further preferably 5% by mass. With the content of the silicon material being the lower limit or more, it is possible to sufficiently increase the charge-discharge capacity of the energy storage device 11. Further, it is also possible to secure a sufficient discharge capacity by a discharge reaction of the silicon material that is for use, for example, in an emergency. On the other hand, an upper limit of the content of the silicon material is preferably 30% by mass, more preferably 20% by mass, further preferably 10% by mass. With the content of the silicon material being the upper limit or less, it is possible to increase the content of the carbon material and thus secure a sufficient discharge capacity for normal use. Further, it is possible to accurately detect the completion time of the discharge because the time when the main discharge reaction in the negative electrode is switched from by the carbon material to by the silicon material is the time when the residual capacity is low.

Comparison of FIG. 3(b) with FIG. 3(c) shows that when the content of silicon oxide is 10% by mass (FIG. 3(c)), the discharge capacity based on graphite accounts for about 50%, whereas when the content of silicon oxide is 5% by mass (FIG. 3(b)), the discharge capacity based on graphite accounts for about 70%. Here, it is general to allow, for example, an electric vehicle to consume electricity in an amount of only about 70% of a rated capacity and feed electricity to the vehicle when the amount of electricity goes below about 30%. Also in cases of electronic devices such as a communication terminal, it is general to charge the electronic devices well in advance when the amount of electricity goes below about 30%. Therefore, the discharge capacity based on the carbon material for use in normal times may be about 70%. In consideration of such matters, the upper limit of the content of the silicon material relative to the total content of the carbon material and the silicon material may be 8% by mass or 6% by mass.

The negative active material layer may further contain a negative active material other than the carbon material and the silicon material. A lower limit of the total content of the carbon material and the silicon material in the negative active material is preferably 90% by mass, more preferably 99% by mass. The negative active material may be substantially formed of only the carbon material and the silicon material. With the content ratio of another negative active material lowered, it is possible to accurately detect the timing of a change in internal pressure change rate.

The negative composite (negative active material layer) may also contain a typical nonmetal element such as B, N, P, F, Cl, Br, or I, a typical metal element such as Li, Na, Mg, Al, K, Ca, Zn, Ga, or Ge, or a transition metal element such as Sc, Ti, V, Cr, Mn, Fe, Co, Ni, Cu, Mo, Zr, Ta, Hf, Nb, or W.

(Separator)

Used as a material for the separator are, for example, woven fabric, nonwoven fabric, and a porous resin film. Among these materials, a porous resin film is preferable from a viewpoint of strength, and nonwoven fabric is preferable from a viewpoint of a liquid retaining property for the nonaqueous electrolyte. A main component of the separator is preferably a polyolefin such as polyethylene or polypropylene from a viewpoint of strength and is preferably, for example, a polyimide or aramid from a viewpoint of resistance to oxidation decomposition. Alternatively, these resins may be made into a composite. In the meantime, it is also possible to use a separator layered with a resin-made substrate and an inorganic layer on a surface of the substrate.

(Nonaqueous Electrolyte)

The nonaqueous electrolyte contains a nonaqueous solvent and an electrolyte salt dissolved in the nonaqueous solvent. The nonaqueous electrolyte may also contain another additive.

As the nonaqueous solvent, it is possible to use a known nonaqueous solvent normally used as a nonaqueous solvent of a general nonaqueous electrolyte for an energy storage device. Examples of the nonaqueous solvent include a cyclic carbonate, a chain carbonate, ester, ether, an amide, a sulfone, a lactone, and a nitrile.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate.

Examples of the chain carbonate include diethyl carbonate (DEC), dimethyl carbonate (DMC), ethyl methyl carbonate (EMC), and diphenyl carbonate.

As the electrolyte salt, it is possible to use a known electrolyte salt normally used as an electrolyte salt of a general nonaqueous electrolyte for an energy storage device. Examples of the electrolyte salt include a lithium salt, a sodium salt, a potassium salt, a magnesium salt, and an onium salt. A lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a fluorohydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$.

(Measuring Section 12)

The measuring section 12 includes a pressure sensor 15, a current sensor 16, and a calculation section 17. The pressure sensor 15 and the current sensor 16 are connected to the calculation section 17.

The pressure sensor 15 detects the internal pressure (pressure applied outward from the inside of the energy storage device 11) depending on, for example, expansion and contraction of the negative electrode that are associated with charge-discharge, and the amount of a change in internal pressure. The pressure sensor 15 as well as the energy storage device 11 is disposed between a pair of constraining plates 18a and 18b. The pair of constraining plates 18a and 18b constrains the energy storage device 11 to prevent the energy storage device 11 from expanding along the thickness (horizontal line in FIG. 1) of the energy storage device 11. That is, the spacing between the constraining plates 18a and 18b is fixed at a certain distance so as not be widened. The pressure sensor 15 is sandwiched between the energy storage device 11 and one of the constraining plates, the constraining plate 18b.

As the pressure sensor 15, it is possible to use, for example, a known sensor that measures the pressure by a pressure-sensitive device through a diaphragm (e.g., a stainless steel diaphragm and a silicon diaphragm), converts the pressure into an electrical signal, and outputs the signal. The pressure signal detected is transmitted to the calculation section 17.

The current sensor 16 is connected between an output terminal of the energy storage device 11 and a load (not shown) of the energy storage device. The current sensor 16 is capable of measuring the amount of charge current and the amount of discharge current of the energy storage device 11.

The calculation section 17 receives from the pressure sensor 15 a signal involving the amount of internal pressure of the energy storage device 11 and from the current sensor 16 a signal involving the amount of charge current and the amount of discharge current of the energy storage device 11. The calculation section 17 calculates, for example, the amount of charge (residual amount of electricity) of the energy storage device 11 from the amount of charge current and the amount of discharge current. The calculation section 17 records, for example, a value of the internal pressure and the amount of charge that change over time and calculates the internal pressure change rate from the amounts of change in value of the internal pressure and in amount of charge. Further, the calculation section 17 is also capable of calculating the charge rate of the energy storage device 11 on the basis of, for example, the internal pressure change rate. The calculation of the charge rate can also be calculated in consideration of, for example, the amount of charge as well as the internal pressure change rate. The calculation section 17 outputs the calculated internal pressure change rate and charge rate, which are transmitted to the transmitting section 13. Thus, the measuring section 12 is capable of measuring the internal pressure change rate.

Further, the calculation section 17 is capable of determining, during discharge, on the basis of the calculated internal pressure change rate, whether the discharge is mainly by the carbon material or by the silicon material. Specifically, the calculation section is capable of determining that the discharge is mainly by a discharge reaction of the carbon material when the internal pressure change rate is at or below a prescribed threshold, and that the discharge is mainly by a discharge reaction of the silicon material when the internal pressure change rate is higher than or equal to the prescribed threshold. The threshold is to be a benchmark for determining whether the discharge is by a discharge reaction of the carbon material or of the silicon material, and the threshold is affected by, for example, the types of the carbon material and the silicon material and the mixing ratio therebetween and can be set according to, for example, the type of the energy storage device 11 in advance.

For example, in FIG. 3(b), the internal pressure change rate in the stage (α) is 0.12 MPa/100 mAh, the stage (α) allowing the carbon material (graphite) to mainly perform its discharge reaction, and the internal pressure change rate in the stage (β) is 0.25 MPa/100 mAh, the stage (β) allowing the silicon material (silicon oxide) to mainly perform its discharge reaction. In FIG. 3(c), the internal pressure change rate in the stage (α) is 0.14 MPa/100 mAh, and the internal pressure change rate in the stage (β) is 0.40 MPa/100 mAh. Accordingly, the threshold when such an energy storage device is used can be set at, for example, 0.2 MPa/100 mAh. The threshold to be a benchmark for the determination may be appropriately changeable and may be a variable in consideration of a parameter such as temperature. Alternatively, the calculation section may be set to determine the point where the internal pressure change rate is raised from a value in full charge by a prescribed value or higher, as the point where the main discharge is switched to by the silicon material. The calculation section 17 outputs this determination result, which is transmitted to the transmitting section 13.

The transmitting section 13 transmits a signal, for example, when the internal pressure change rate measured by the measuring section 12 reaches or exceeds a prescribed threshold. This signal is a signal indicating that the internal pressure change rate has reached or exceeded a prescribed threshold, in other words, that the charge rate of the energy storage device 11 is lowered. This signal is transmitted to the display part 14. The threshold may be the same as the threshold that is a benchmark for determination by the calculation section 17. The threshold can be set according to, for example, the type of the energy storage device 11 in advance, may be appropriately changeable, and may be a variable in consideration of a parameter such as temperature. The transmitting section 13 may be designed so as to transmit a signal when the internal pressure change rate starts to rise. The signal is a signal indicating that the internal pressure change rate has started to rise, in other words, that the charge rate of the energy storage device 11 is lowered. For example, in the stage (α) of FIGS. 3(b) and 3(c), however, a variation in internal pressure change rate is somewhat generated. Therefore, for example, the point where the internal pressure change rate rises from an initial value by a prescribed value or more may be set as the point where the internal pressure change rate starts to rise.

The transmitting section 13 transmits a signal involving values of the internal pressure change rate and the charge rate that are measured by the measuring section 12 as well as a signal involving a determination result that is determined by the calculation section 17 and that indicates whether the discharge is mainly by the carbon material or the silicon material. These signals are also transmitted to the display part 14.

The calculation section 17 and the transmitting section 13 can be configured to include a computer and a computer program. The calculation section 17 and the transmitting section 13 may be configured to include a processor a part or the whole of which is formed of a semiconductor chip. The calculation section 17 and the transmitting section 13 may be an integrated component or separate different components.

(Display Part 14)

The display part 14 displays, for example, a lowered charge rate on the basis of the signal from the transmitting section 13. Specifically, the display part 14 is capable of displaying information on the internal pressure change rate, the charge rate, whether the main discharge reaction is by a discharge reaction of the carbon material or of the silicon material, and a lowered charge rate that have been calculated by the calculation section 17.

The display of the internal pressure change rate and the charge rate may be a digital display of a numerical value itself or an analog display. Alternatively, only the information may be displayed that indicates that the internal pressure change rate has reached or exceeded a prescribed value or that the charge rate has lowered to or become below a prescribed value.

The information on whether the main discharge is by a discharge reaction of the carbon material or of the silicon material can be displayed, for example, by a display method of providing lamps for the "carbon material" and the "silicon material" and blinking the lamp of either material that is performing the main discharge reaction. The information on a lowered charge rate can also be displayed, for example, by a display method of blinking a lamp when the charge rate is lowered.

The display part 14 may be configured to display a piece of information other than these pieces of information. For example, the display part may be configured to display warning when the internal pressure of the energy storage device 11 reaches or exceeds a prescribed value. A conventionally known display apparatus is applicable to the display part 14. The energy storage apparatus may also be configured to include, together with each display or in place of the display part 14, an alarm that notifies a user of the information by sound or voice.

<Use Method>

Hereinafter, described as a method of using the energy storage apparatus 10 in FIG. 1 is a method of using an energy storage apparatus according to one embodiment of the present invention.

The method of using the energy storage apparatus 10 according to the one embodiment of the present invention includes performing discharge while the internal pressure change rate of the energy storage device 11 is measured. Further, the use method may also include charging the apparatus when the internal pressure change rate reaches or exceeds a prescribed value.

The internal pressure change rate of the energy storage device 11 is automatically measured by the measuring section 12. When the internal pressure change rate reaches or exceeds a prescribed value or starts to rise along with progress of the discharge, the display part 14 displays a lowered charge rate of the energy storage device 11 on the basis of the signal from the transmitting section 13. Further, when the internal pressure change rate reaches or exceeds a prescribed value or starts to rise, the display part 14 displays information indicating that the discharge is mainly by a discharge reaction of the silicon material. Further, the display part 14 is also capable of displaying the internal pressure change rate and the charge rate.

On the basis of these pieces of information displayed on the display part 14, a user is capable of stopping the discharge and charging the apparatus. For example, when the energy storage apparatus is charged at the timing of the internal pressure change rate reaching or exceeding a prescribed value and a display indicating that the discharge is mainly by a discharge reaction of the silicon material, it is possible to use the energy storage device 11 substantially using only the discharge reaction of the carbon material. Such a manner restricts use of the silicon material in normal times and is capable of achieving long life of the energy storage apparatus. On the other hand, when the internal pressure change rate reaches or exceeds a prescribed value but the discharge is still needed, the discharge can be continued using the discharge of the silicon material. For example, as regards an electric vehicle including the energy storage apparatus 10 as a power source thereof, when the internal pressure change rate reaches or exceeds a prescribed value but no charge station is found nearby, it is possible to continuously drive the vehicle using the discharge reaction of the silicon material. Thus, only the discharge reaction of the carbon material is mainly used repetitively in normal times and the discharge reaction of the silicon material is used only, for example, in an urgent moment or in an emergency, to prevent deterioration of the silicon material and thus enable long life of the energy storage apparatus. The silicon material having a large capacity per volume and mass enables a sufficient amount of discharge in an emergency even when the content of the silicon material is relatively lower than the content of the carbon material.

It is also possible to repetitively use the discharge reaction of the silicon material even in normal times to a certain degree. Thus, the discharge reaction of the silicon material is partially used for normal discharge to increase the amount of electricity that can be used in normal times. By restricting a use range of the silicon material that is easily deteriorated in normal use, deterioration in the whole silicon material is prevented. For example, by repetitively using substantially all the carbon material and a part of the silicon material, it is possible to increase the discharge capacity and achieve long life of the energy storage apparatus. Such a use method more effectively functions when elemental silicon is used that has large expansion and contraction during charge-discharge among silicon materials.

In the energy storage apparatus 10, the pressure sensor 15 also measures the internal pressure itself of the energy storage device 11. Therefore, it is possible to detect a rise in internal pressure when the internal pressure is abnormally risen due to, for example, generation of gas or heat. Accordingly, the energy storage apparatus 10 is also capable of improving safety. In the energy storage apparatus 10, the internal pressure change rate or the like may be measured also during charge.

Other Embodiments

The present invention is not limited to the embodiments described above and it is possible to implement the present invention not only by the aspects described above but also by an aspect with various changes and improvement. For example, mainly described in the above embodiments is the energy storage device as a nonaqueous electrolyte secondary battery. Another energy storage device, however, may be applied. Examples of the other energy storage device include a capacitor (an electric double layer capacitor or a lithium ion capacitor) and an energy storage device including water as an electrolyte.

Figure 2:
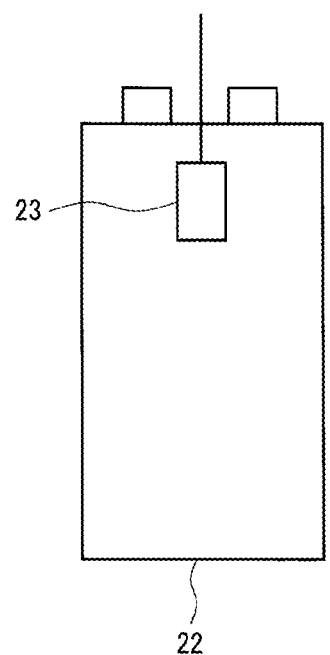
FIG. 2 is a schematic view showing a part of an energy storage apparatus according to another embodiment of the present invention.

In the energy storage apparatus 10 of FIG. 1, the pressure sensor 15 is disposed outside the energy storage device 11. As shown in FIG. 2, however, a pressure sensor 23 may be disposed inside an energy storage device 22. A disposition place of the pressure sensor 23 inside the energy storage device 22 is not particularly limited but is preferably in a center portion. The pressure sensor 23 is disposed in the center portion inside the energy storage device 22, to suppress an influence on charge-discharge while being capable of efficiently detecting a change in pressure. Examples of the center portion include a gap between a case on the center axis of a wound electrode assembly and the electrode assembly, and a center portion in an electrode assembly. The pressure sensor 23 may be provided so as to cover the whole surface of an electrode assembly. Disposition of the pressure sensor for each energy storage device as in FIGS. 1 and 2 enables monitoring the state of each energy storage device with high accuracy.

In the energy storage apparatus 10 of FIG. 1, the display part 14 displays information on the internal pressure change rate, the charge rate, whether the main discharge reaction is by a discharge reaction of the carbon material or of silicon oxide, and a lowered charge rate. The display part, however, may display only a part of these pieces of information. The calculation section 17 does not have to calculate all these pieces of information and the transmitting section 13 also does not have to transmit all the signals involving these pieces of information. The energy storage apparatus can be designed with appropriate selection of only necessary information for calculation and display according to, for example, the purpose of use.

INDUSTRIAL APPLICABILITY

The present invention is applicable to an energy storage apparatus used as a power source of, for example, electronic devices and vehicles and to a method of using the energy storage apparatus. Particularly, the present invention can be suitably used as a power source for vehicles such as an electric vehicle (EV), a hybrid vehicle (HEV), a plug-in hybrid vehicle (PHEV) and as a method of using the power source.

DESCRIPTION OF REFERENCE SIGNS

10: Energy storage apparatus
11, 22: Energy storage device
12: Measuring section
13: Transmitting section
14: Display part
15, 23: Pressure sensor
16: Current sensor
17: Calculation section
18*a*, 18*b*: Constraining plate

The invention claimed is:

1. An energy storage apparatus comprising:
an energy storage device including a negative electrode that contains a carbon material and a silicon material;
a measuring section for measuring an internal pressure change rate of the energy storage device; and
a transmitting section for transmitting a signal based on the internal pressure change rate measured by the measuring section:
reaching or exceeding a prescribed threshold; or
starting to rise,
wherein the internal pressure change rate includes a rate of an amount of change in an internal pressure with respect to an amount of change in an amount of charge electricity in the energy storage device.

2. The energy storage apparatus according to claim 1, wherein a proportion of the silicon material is 10% by mass or less in a total of the carbon material and the silicon material.

3. A method of using the energy storage apparatus according to claim 1, the method comprising performing discharge while the internal pressure change rate of the energy storage device is measured.

4. The energy storage apparatus according to claim 1, further comprising a first display part configured to allow a user to complete a discharge and charge the energy storage apparatus based on the signal of the transmitting section.

5. The energy storage apparatus according to claim 1, further comprising a first display part configured to allow a user to complete a discharge of the carbon material based on the signal of the transmitting section.

6. An energy storage apparatus comprising:
an energy storage device including a negative electrode that contains a carbon material and a silicon material;
a measuring section for measuring an internal pressure change rate of the energy storage device; and
a transmitting section for transmitting a signal based on the internal pressure change rate measured by the measuring section reaching or exceeding a prescribed threshold,
wherein the internal pressure change rate includes a rate of an amount of change in an internal pressure with respect to an amount of change in an amount of charge electricity in the energy storage device.

7. The energy storage apparatus according to claim 6, wherein a proportion of the silicon material is 10% by mass or less in a total of the carbon material and the silicon material.

8. A method of using the energy storage apparatus according to claim 6, the method comprising performing discharge while the internal pressure change rate of the energy storage device is measured.

9. An energy storage apparatus comprising:
an energy storage device including a negative electrode that contains a carbon material and a silicon material;
a measuring section for measuring an internal pressure change rate of the energy storage device; and
a transmitting section for transmitting a signal based on the internal pressure change rate measured by the measuring section starting to rise,
wherein the internal pressure change rate includes a rate of an amount of change in an internal pressure with respect to an amount of change in an amount of charge electricity in the energy storage device.

10. The energy storage apparatus according to claim 9, wherein a proportion of the silicon material is 10% by mass or less in a total of the carbon material and the silicon material.

11. A method of using the energy storage apparatus according to claim 9, the method comprising performing discharge while the internal pressure change rate of the energy storage device is measured.

* * * * *